United States Patent
Ha et al.

(10) Patent No.: US 6,659,030 B2
(45) Date of Patent: Dec. 9, 2003

(54) APPARATUS AND METHOD FOR DECREASING DRAG FORCE BY CONTROLLING TURBULENT FLOW ON HULL SURFACE OF SHIP

(75) Inventors: Mun-Keun Ha, Geoje (KR); Hyung-Jin Sung, Daejeon (KR); Bu-Geun Back, Geoje (KR)

(73) Assignees: Korea Advanced Institute of Science and Technology (KR); Samsung Heavy Industries Co., Ltd. (KR)

( * ) Notice: Subject to any disclaimer, the term of this patent is extended or adjusted under 35 U.S.C. 154(b) by 0 days.

(21) Appl. No.: 10/113,120

(22) Filed: Mar. 29, 2002

(65) Prior Publication Data

US 2002/0166491 A1 Nov. 14, 2002

(30) Foreign Application Priority Data

Mar. 29, 2001 (KR) ......................................... 2001-16601
Mar. 27, 2002 (KR) ......................................... 2002-16593

(51) Int. Cl.$^7$ ................................................. B63B 1/34
(52) U.S. Cl. ..................................................... 114/67 A
(58) Field of Search .............................. 114/67 A, 67 R

(56) References Cited

U.S. PATENT DOCUMENTS

2001/0022152 A1 * 9/2001 Takahashi ................. 114/67 A
2002/0152947 A1 * 10/2002 Hilleman ..................... 114/338

* cited by examiner

Primary Examiner—Stephen Avila
(74) Attorney, Agent, or Firm—Cantor Colburn LLP

(57) ABSTRACT

The present invention relates to an apparatus and method for decreasing drag force by controlling turbulent flow in a hull surface of a ship. The method and apparatus according to the present invention are directed to sucking and ejecting the fluid flowing along a hull surface of a ship, varying the turbulent field of the turbulent flow, controlling the ejection angle with respect to the hull surface and decreasing the friction resistance by providing a pipe housing which is installed in a hull surface of a ship and includes a plurality of slits, a flexible air pipe which is installed in the interior of the pipe housing and performs contracting and expanding operation based on air pumping operation, and a pump which is installed in the hull for contracting and expanding the air pipe and providing air to the air pipe. The pipe housing including the flexible air pipe is installed inside or outside the hull surface for thereby contracting or expanding the air pipe using the pump, so that the fluid from the slits is sucked and ejected to vary the turbulent field of the turbulent flow formed on the hull surface and decreasing the friction resistance.

10 Claims, 5 Drawing Sheets

APPARATUS AND METHOD FOR DECREASING DRAG FORCE BY CONTROLLING TURBULENT FLOW ON HULL SURFACE OF SHIP

BACKGROUND OF THE INVENTION

1. Field of the Invention

The present invention relates to an apparatus and method for decreasing drag force by controlling turbulent flow on a hull surface of a ship, and more particularly, to an apparatus and method for decreasing drag force by controlling turbulent flow on the hull surface by performing suction and ejection of fluid flowing around the hull surface to decrease friction resistance thereon.

2. Description of the Related Art

When a ship is out at sea, friction resistance is caused on a hull surface of the ship due to vortex flow on the hull surface. This friction resistance generally takes a significant portion of the total resistive drag force which a ship is subject to at sea. For example, in case of an oil carrier, the friction resistance takes about 80% of the total drag force.

There has been a development in techniques of decreasing the friction resistance occurring on a hull surface of a ship. A widely used method is ejecting air or syrupy liquid from a bow side of a ship. However, there have been difficulties in decreasing the friction resistance in the conventional methods and apparatuses.

BRIEF SUMMARY OF INVENTION

The present invention provides an apparatus and method for decreasing drag force based on a control of turbulent flow on a hull surface of a ship, in which fluid flowing around the hull surface of a ship is sucked and ejected, and an ejection angle with respect to the hull surface is adjusted, to thereby control the turbulent flow on the hull surface.

The present invention also provides an apparatus and method for decreasing drag force by controlling turbulent flow on a hull surface of a ship, in which suction and ejection of fluid flowing around the hull surface extended from the inside of the hull of a ship is repeatedly performed by installing a pipe housing including a flexible air pipe or plates along the hull surface of a ship, to thereby control a turbulent flow boundary layer on the hull surface.

The present invention further provides an apparatus and method for decreasing drag force by controlling turbulent flow on a hull surface of a ship, in which the turbulent flow is locally controlled by installing an apparatus having a flexible air pipe or plates at a bow or stem of the ship.

In an exemplary embodiment of the present invention, there is provided a method for decreasing drag force by controlling turbulent flow in a hull surface of a ship in which fluid flowing around the hull surface of a ship is sucked and ejected to vary turbulent field of the fluid flow, and friction resistance is decreased by controlling an ejection angle with respect to the hull surface of a ship.

In another exemplary embodiment of the present invention, there is provided an apparatus for decreasing drag force by controlling turbulent flow on a hull surface of a ship, which includes a pipe housing which is installed on the hull surface of a ship and includes a plurality of slits, a flexible air pipe which is installed in the interior of the pipe housing and performs a contracting and/or expanding operation in association with an air pumping operation, and a pump which is connected to the flexible air pipe, for sucking and discharging the air.

In another exemplary embodiment of the present invention, there is provided an apparatus for decreasing drag force by controlling turbulent flow on a hull surface of a ship, which includes a pipe housing which is installed on the hull surface of a ship and includes a plurality of slits, plates which are installed in the pipe housing and positioned in the upper and lower portions of the respective slits, a first rod connected with the plates positioned in the upper portions of the respective slits, a second rod connected with the plates positioned in the lower portions of the respective slits, and a motor which is installed in the interior of the ship and connected to the first and second rods to drive the first and second rods.

BRIEF DESCRIPTION OF DRAWINGS

The present invention will become better understood with reference to the accompanying drawings which are given for illustration purpose, and thus the present invention is not limited to the exemplary embodiments in the drawings, wherein.

DETAILED DESCRIPTION OF INVENTION

A turbulent flow variation of a turbulent boundary layer is analyzed based on local disturbance and a detailed description thereof follows.

Figure 1:
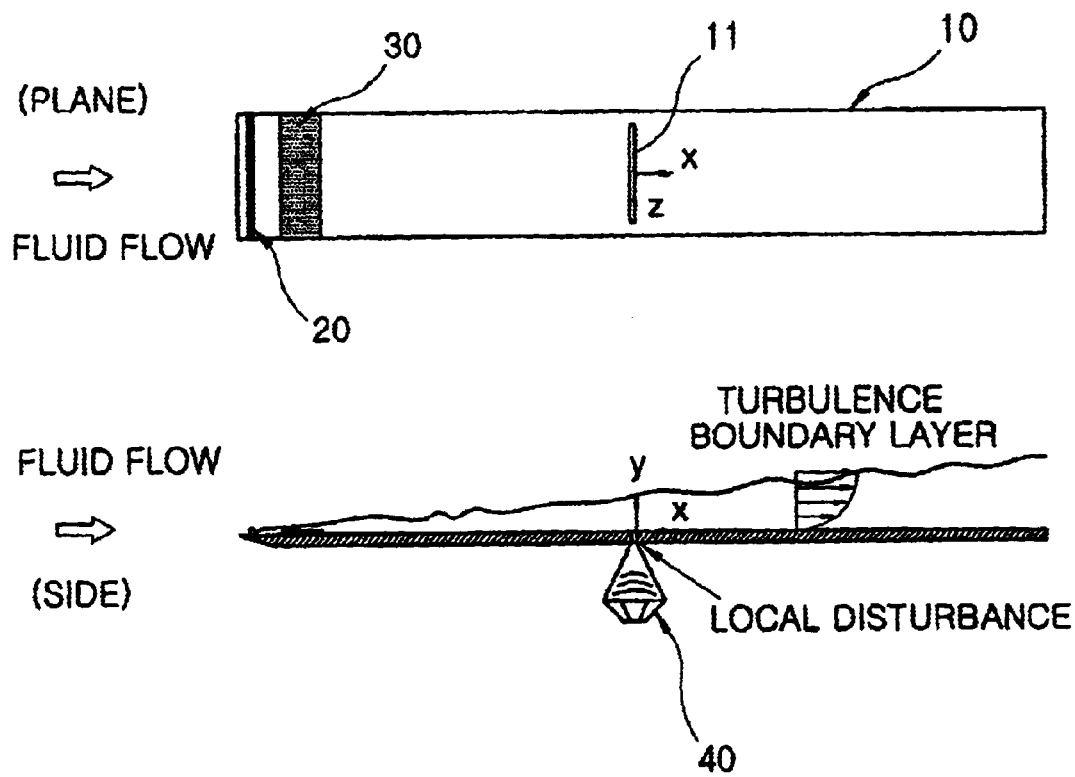
FIG. 1 is a view illustrating an apparatus for performing local suction and ejection operation according to the present invention.
Figure 2:
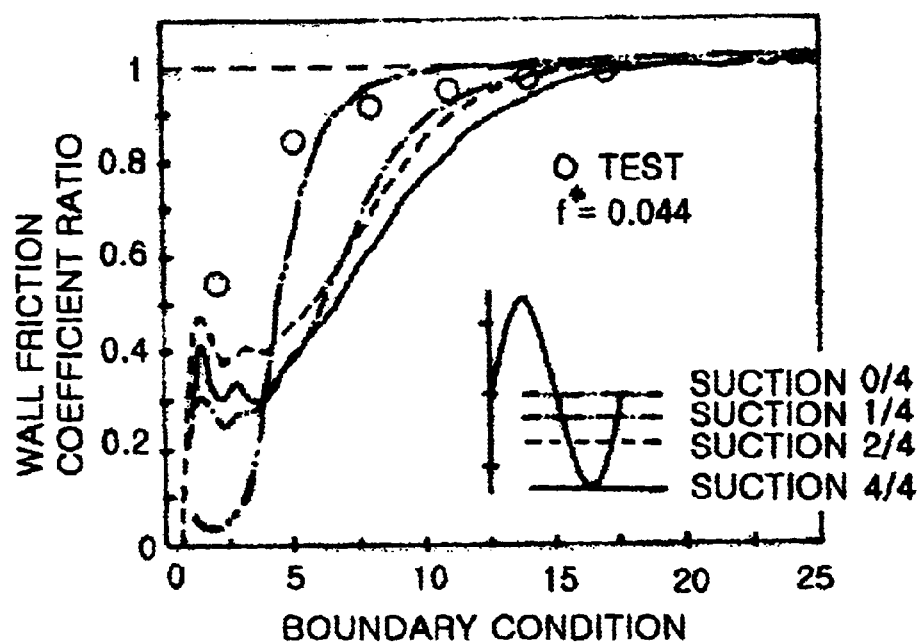
FIG. 2 is a graph illustrating distribution of wall surface friction coefficients under various suction conditions according to the present invention.
Figure 3:
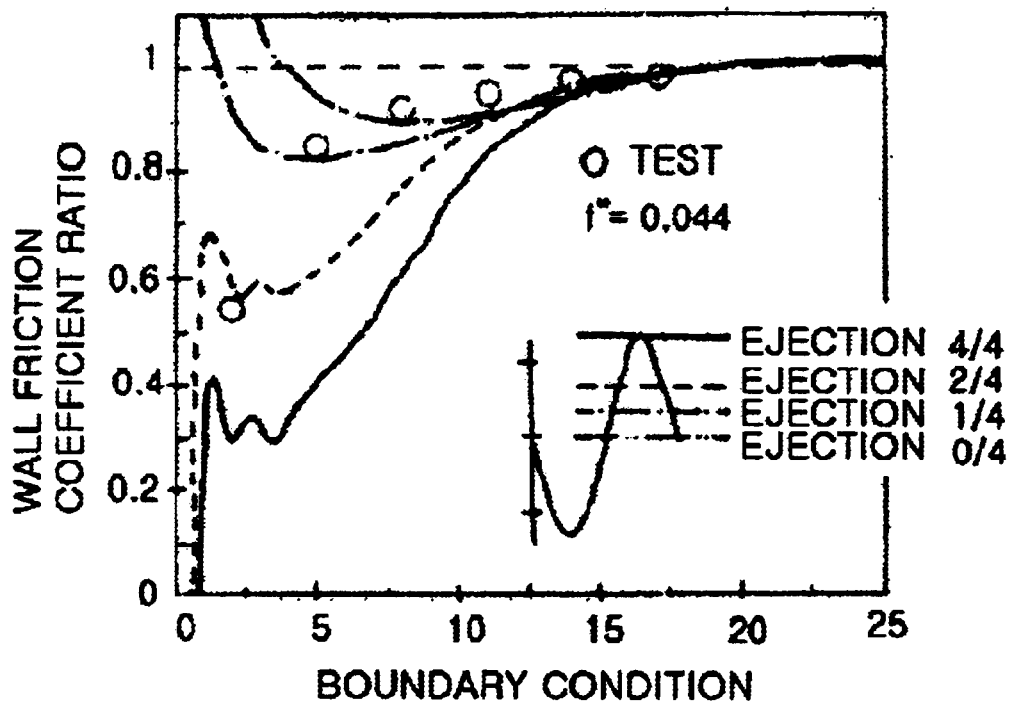
FIG. 3 is a graph illustrating distribution of wall surface friction coefficients under various ejection conditions according to the present invention.
Figure 4:
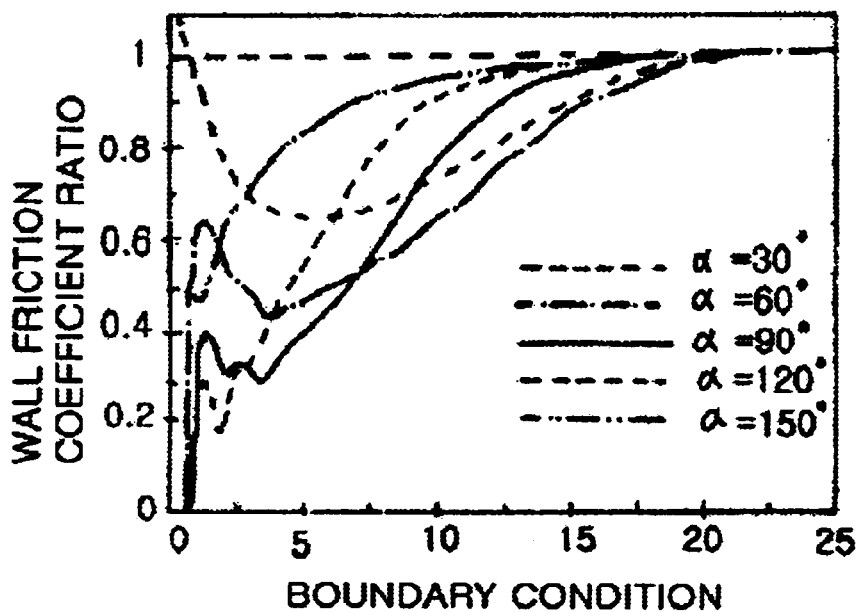
FIG. 4 is a graph illustrating distribution of wall surface friction coefficients under various ejection angles according to the present invention.

FIG. 1 is a view illustrating an apparatus for performing local suction and ejection operation according to the present invention, FIG. 2 is a graph illustrating distribution of wall surface friction coefficients under various suction conditions at a selected frequency according to the present invention, FIG. 3 is a graph illustrating wall surface friction coefficients under various ejection conditions at a selected frequency according to the present invention, and FIG. 4 is a graph illustrating distribution of wall surface friction coefficients under various ejection angles according to the present invention.

As shown in FIG. 1, the apparatus for local suction and ejection includes a flat plate 10 having a slot 11, which may be used as a hull surface of a ship. A trip line 20 is installed at an end portion of an upper surface of the flat plate 10. A piece 30 having rough surface is installed beside the trip line 20. A speaker 40 for performing local suction and ejection is installed in a lower portion of the slot 11 of the flat plate 10.

In addition, local suction and ejection by using the speaker 40 are performed through the slot 11 of the flat plate 10 in such a manner that a turbulent flow boundary layer is formed by a turbulent flow on the upper side of the flat plate 10 in which the trip line 20 is installed. In the above local suction and ejection operations, the ejection operation is well performed. However, the suction operation is not well performed due to a compression effect of air.

Numerical value analysis according to the degree of suction is performed. As shown in FIG. 2, as the amount of suction is increased in a portion near the slot, a stronger turbulence with a certain turbulent energy comes down to near the wall surface to increase the wall surface friction coefficient. When the amount of suction is increased over a certain degree, since the turbulent layer mixed by ejection is changed to a reverse direction turbulence near the slot, so that the average friction coefficient is slightly decreased. In the downstream far from the slot, as the amount of the suction is increased, the wall surface friction coefficient is decreased.

As shown in FIG. 3, the wall surface friction coefficient according to the variation of the amount of the ejection is not affected by an increase in the ejection amount in the downstream far from the slot. As the ejection amount is increased, the wall surface friction coefficient is gradually decreased near the slot. The above phenomenon occurs due to a reverse flow direction near the slot at the time when the ejection starts. As the ejection is increased, the reverse direction turbulence is more increased, and the average friction coefficient is gradually decreased.

As shown in FIG. 4, according to a correlation between the ejection angle and the wall surface friction coefficient for the local turbulence, a friction coefficient decreasing effect occurs in more regions when the ejection is performed at the angle of 60°, compared with when the ejection is performed vertically to the wall surface. In the case that the ejection angle is above 90°, the speed of the convection current generated in the slot is decreased and does not reach to the downstream. Therefore, as the ejection angle is increased, the regions in which the friction coefficient is decreased are decreased. In the case that the ejection angle is below 60°, since the occurrence of a re-circulation region which is formed during the ejection is restricted, the regions in which the friction coefficient is decreased are reduced.

The exemplary embodiments of the apparatus according to the present invention will be explained based on a result of the analysis with respect to the numerical analysis.

Figure 5:
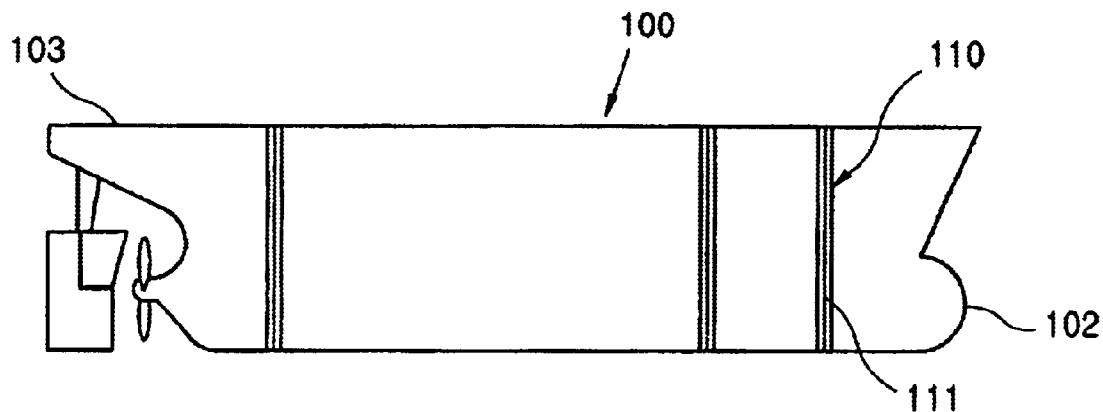
FIG. 5 is a schematic view illustrating a drag force decreasing apparatus by controlling turbulent flow on a hull surface of a ship according to the present invention.
Figure 6:
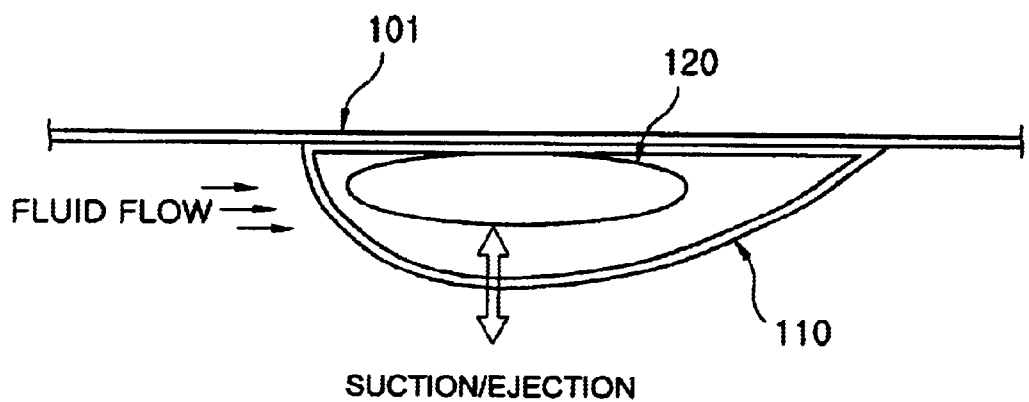
FIG. 6 is a cross-sectional view illustrating a pipe housing of the drag force decreasing apparatus in FIG. 5.
Figure 7:
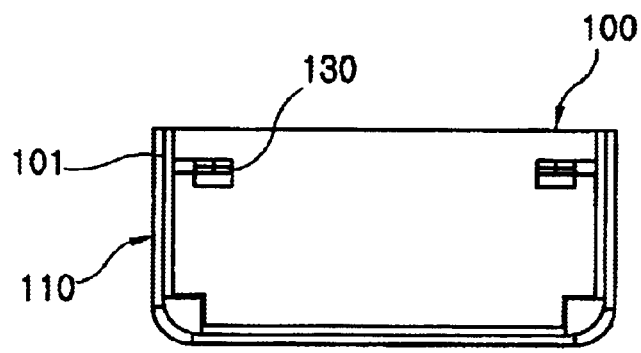
FIG. 7 is a front cross-sectional view for explaining a connection state of a pump for the drag force decreasing apparatus according to the present invention.
Figure 8:
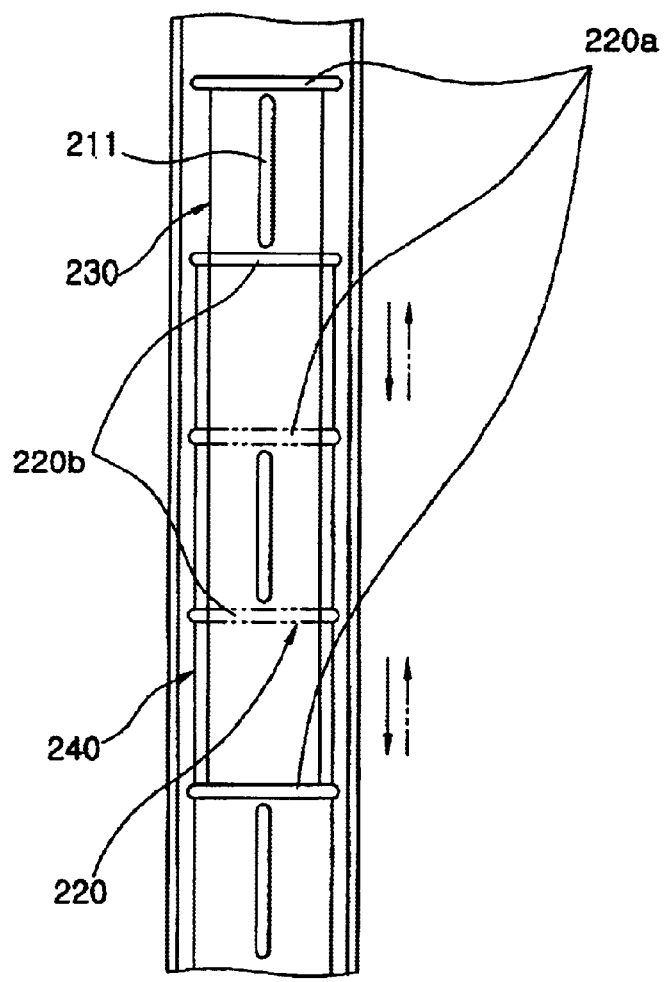
FIG. 8 is a schematic view for explaining a drag force decreasing apparatus according to another embodiment of the present invention.
Figure 9:
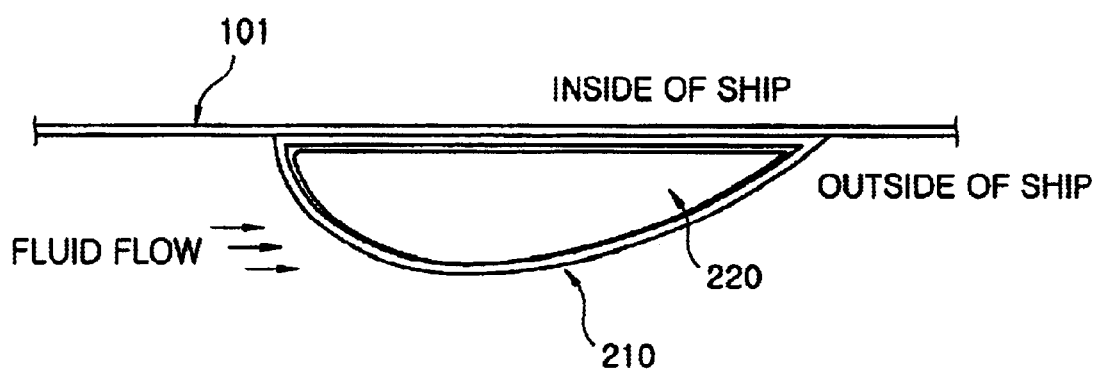
FIG. 9 is a cross-sectional view illustrating a pipe housing of the drag force decreasing apparatus in FIG. 8.
Figure 10:
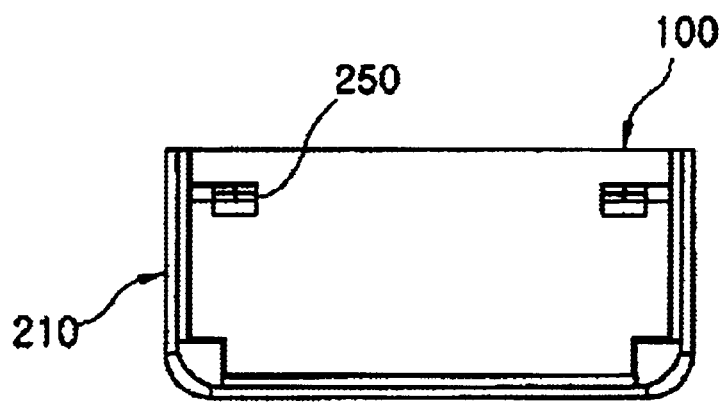
FIG. 10 is a front cross-sectional view for explaining a connection state of a motor for the drag force decreasing apparatus according to another embodiment of the present invention.
Figure 11:
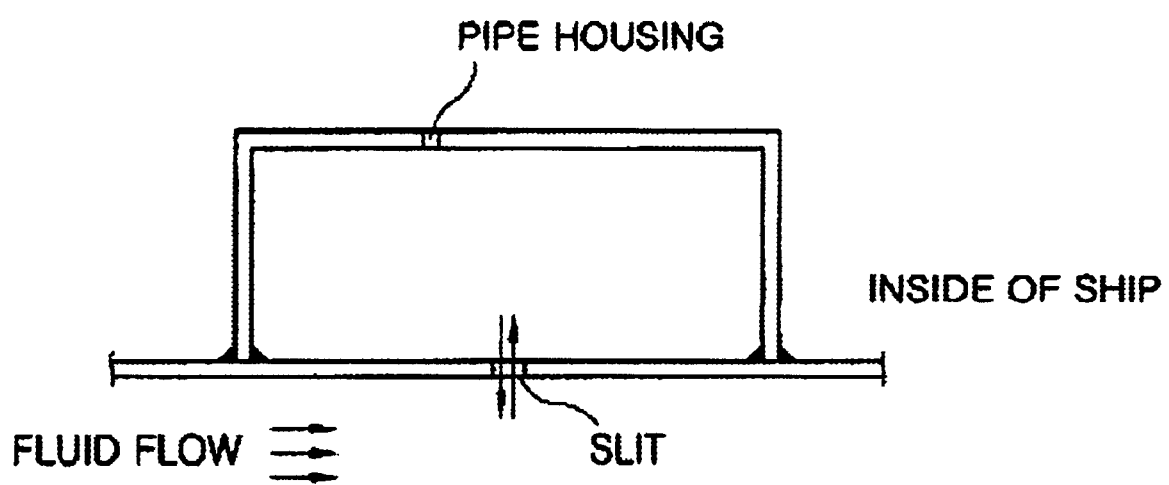
FIG. 11 is a cross-sectional view illustrating a state that a pipe housing of a drag force decreasing apparatus by controlling turbulent flow in a hull surface of a ship is installed in the interior of the ship according to the present invention.

FIG. 5 is a schematic view illustrating a drag force decreasing apparatus based on a control of turbulent flow in a hull surface of a ship according to the present invention, FIG. 6 is a cross-sectional view illustrating a pipe housing of the drag force decreasing apparatus based on a control of turbulent flow in a hull surface of a ship according to the present invention, FIG. 7 is a front cross-sectional view for explaining a connection state of a pump of the drag force decreasing apparatus based a control of turbulent flow in a hull surface of a ship according to the present invention, FIG. 8 is a schematic view of another embodiment of the drag force decreasing apparatus based on a control of turbulent flow of a hull surface of a ship according to the present invention, FIG. 9 is a cross-sectional view illustrating a pipe housing of the drag force decreasing apparatus based on a control of turbulent flow in a hull surface of a ship according to the present invention, FIG. 10 is a front cross-sectional view for explaining a connection state of a motor for the drag force decreasing apparatus based on a control of turbulent flow in a hull surface of a ship according to the present invention, and FIG. 11 is a cross-sectional view illustrating a state that a pipe housing of a drag force decreasing apparatus based on a control of turbulent flow in a hull surface of a ship is installed inside a ship according to the present invention.

The drag force decreasing apparatus using a control of turbulent flow in a hull surface of a ship according to the present invention has, for example, two types of structures. One is using a flexible air pipe installed in the interior of a pipe housing, and the other is using a plate in the interior of a pipe housing, which is operated by a mechanical driving operation.

As shown in FIGS. 5 through 7, in the case that the flexible air pipe is used, a pipe housing 110 in which a plurality of slits 111 are formed along the hull surface 101 of the ship 100 is vertically installed in a string shape. The pipe housing 110 is formed in a hollow aerodynamic shape. The pipe housing 110 may also be formed in various shapes such as a semi circle shape or elliptical shape. The slit 111 may be formed in the shape of a circle hole and formed at a certain portion in such a manner that the ejection angle with respect to the hull surface 101 is 60° based on the kinds and speed of the ship.

A flexible air pipe 120 is installed in the interior of the pipe housing 110 in which the slits 111 are formed, and is connected with a pump 130 for sucking and compressing the air for a contraction and expansion of the flexible air pipe 120. The pump 130 connected with the flexible air pipe 120 is installed in the interior of the ship 100.

As shown in FIGS. 8 through 10, in the case that the plate is used, a pipe housing 210 in which a plurality of slits 211 are formed along the hull surface 101 of the ship 100 is installed vertically in a strip shape. Here, the pipe housing 210 is formed in a hollow aerodynamic shape and may also be formed in various shapes such as a semi circular shape or an elliptical shape. The slits 211 may be formed in a circular hole shape and installed at an ejection angle of about 60°~120° with respect to the hull surface 101 based on the kinds and speed of the ship.

The plate 220 is installed in the interior of the pipe housing 210. An upper plate 220a and a lower plate 220b are positioned in the upper and lower sides of each slit 211, respectively.

A first rod 230 is connected with the plate 220 installed in the interior of the pipe 210 in such a manner that only the upper plates 220a positioned in the upper portion of the slits 211 are connected. A second rod 240 is connected with the plate 220 in such a manner that only the lower plates 220b positioned in the lower portion of the slits 211 are connected.

The first and second rods 230 and 240 are connected with the motor 250 in such a manner that the first and second rods 230 and 240 are driven by the motor 250. As the first and second rods 230 and 240 are lifted or lowered according to the operation of the motor 250, the plates 220a and 220b opposite to each other are contracted or expanded, so that sea water is discharged or sucked through the slits 211. The motor 250 is installed in the interior of the ship.

The drag force decreasing apparatus for a ship employing the flexible air pipe 120 or the plates 220 may be locally installed in the bow portion 102 and the stem portion 103 of the ship.

The operation of the drag force decreasing apparatus using a control of turbulent flow in a hull surface of a ship according to the present invention will be explained with reference to the accompanying drawings.

Referring again to FIGS. 5–7, in the case that the flexible air pipe 120 is used, when the pump 130 installed in the interior of the ship 100 is driven, the flexible air pipe 120 installed in the interior of the pipe housing 110 is inflated. Therefore, it is expanded in the pipe housing. When the air is discharged from the air pipe 120, the operation in which the fluid is discharged or sucked into the housing through the slits 111 is repeatedly performed.

Namely, as the flexible air pipe 120 compresses and discharges the air, the flexible air pipe 120 is expanded and contracted. When the flexible air pipe 120 is contracted, the fluid surrounding the hull is sucked into the empty space of the interior of the pipe housing 110 through the slits 111. When the flexible air pipe 120 is expanded, the interior space of the pipe housing 110 is expanded, and the thusly sucked fluid is flown out of the interior of the pipe housing 110 through the slits 111. The slit 111 preferably has about 60°~120° ejection angle range with respect to the hull surface 101.

Referring again to FIGS. 8–10, in the case that the plate 220 is used, when the motor 250 is driven, the first and second rods 230 and 240 connected with the motor 250 are upwardly and downwardly operated in the opposite direction, so that the upper plates 220a connected to the first rod 230 are downwardly moved and compressed, and the lower plates 220b connected to the second rod 240 are upwardly moved, so that the plates are compressed in the upward and downward directions with respect to the slits 211. When the plates are compressed in the upward and downward directions, the interior fluid is discharged to the outside through the slits 211. On the contrary, when the first rod 230 is upwardly moved and the second rod 240 is downwardly moved, the portion between the plates 220a and 220b is widened, so that the fluid near the slits 211 is sucked.

The slits 211 formed in the pipe housing 210 eject the fluid at about 60°~120° ejection angle with respect to the hull surface 101.

The above pipe housing may be installed in the interior of the hull in such a manner that the pipe housing communicates with the outside through the slits between the hull surface.

Therefore, the apparatus for sucking and ejecting fluid over the entire outer surface of the hull of a ship using the flexible air pipe 120 or the plates 220 according to the present invention disturbs the fluid flow along the hull surface by using the suction and ejection of fluid at an optimum ejection angle. As a result, the friction resistance is decreased by preventing occurrence of the stream wise vortex flow on the hull surface of a ship.

In addition, in the case that the apparatus for decreasing the drag force by using a control of turbulent flow in a hull surface of a ship according to the present invention is installed in a rudder of a ship, it is possible to prevent cavitation of the rudder by controlling the turbulent flow of fluid around the rudder.

As described above, in the apparatus and method for decreasing a drag force by using a control of turbulent flow in a hull surface of a ship according to the present invention, it is possible to vary a turbulent field of the turbulent flow based on suction and ejection of fluid by operations of the flexible air pipe or the plates. In addition, it is possible to decrease the friction resistance by controlling the ejection angle with respect to the hull surface. Thus, the stream wise vortex flow is prevented in the hull surface to decrease the drag force of ocean current which affects the advance of a ship.

In addition, the apparatus for decreasing a drag force of a ship using the flexible air pipe or plates is installed in the steering gear of the ship, so that it is possible to control turbulence of fluid around the rudder, to prevent cavitation of the rudder.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An apparatus for decreasing drag force by controlling turbulent flow on a hull surface of a ship, the apparatus comprising:

a pipe housing which is installed in the hull surface of the ship and includes a plurality of slits;

a flexible air pipe which is installed in the interior of the pipe housing and contracted or expanded in response to an air pumping operation; and a pump which is installed in the hull for contracting and expanding the flexible air pipe and for providing air to the flexible air pipe.

2. The apparatus of claim 1, further comprising:

plates installed in upper and lower portions of a slit along the interior of the pipe housing in which a plurality of slits are formed;

first and second rods connected with the plates; and a motor connected with the first and second rods, respectively, for driving the first and second rods.

3. The apparatus of claim 1, wherein said apparatus for decreasing drag force of a ship using the flexible air pipe is locally installed in a bow or stern of the ship to control local fluid flow around the ship.

4. The apparatus of claim 2, wherein said apparatus for decreasing drag force of a ship using the plates is locally installed in a bow or stern of the ship to control local fluid flow around the ship.

5. The apparatus of claim 1, wherein said pipe housing is installed in the interior of the hull of a ship.

6. The apparatus of claim 2, wherein said pipe housing is installed in the interior of the hull of a ship.

7. A method for decreasing drag force by controlling turbulent flow on a hull surface of a ship, comprising the steps of:

sucking and ejecting fluid flowing along the hull surface of the ship to vary turbulent field of the fluid flow; and controlling an ejection angle with respect to the hull surface of the ship, the sucked fluid being ejected at the ejection angle, wherein friction resistance on the hull surface is decreased by performing the sucking and ejecting and controlling steps, wherein said ejection angle is in the range of about 60°~120°, wherein the sucking and ejecting step includes:
 providing a container with a slit;
 sucking the fluid into the container through the slit; and
 ejecting the sucked fluid out of the container through the slit at the ejection angle.

8. An apparatus for decreasing drag force by controlling turbulent flow on a hull surface of a ship, the apparatus comprising:

a pipe housing installed on the hull surface of the ship, the pipe housing including a plurality of slits through which fluid is sucked into or ejected out;

first plates each disposed at one end of each slit;

second plates each disposed at the other end of each slit;

a first rod for connecting the first plates with each other;

a second rod for connecting the second plates with each other;

a motor for moving the first and second rods in opposite directions, respectively.

9. The apparatus of claim 8, wherein the apparatus for decreasing drag force is locally installed in a bow or stern of the ship to control local fluid flow around the ship.

10. The apparatus of claim 8, wherein the pipe housing is installed in the interior of a hull ship.

* * * * *